April 4, 1950     E. O. H. HANSSON     2,502,564
GEARING HOUSING
Filed Feb. 7, 1948
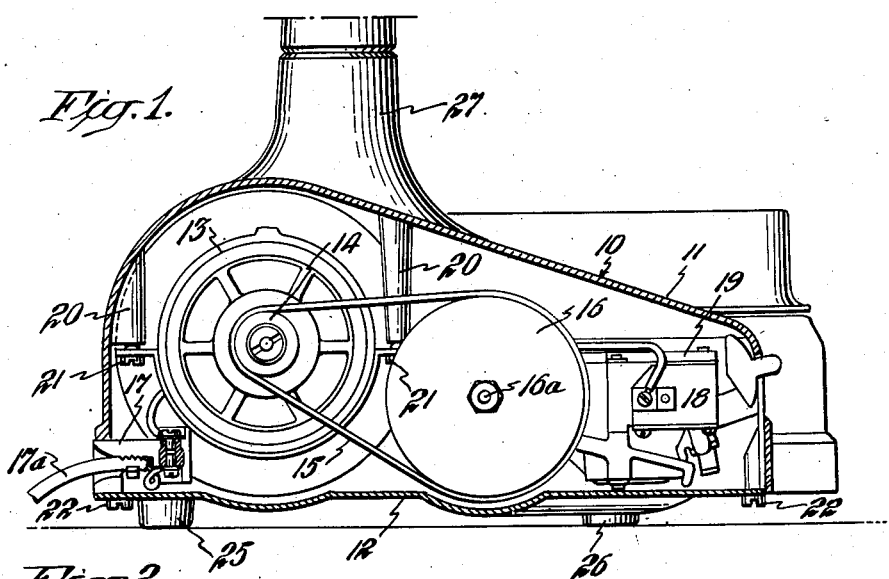
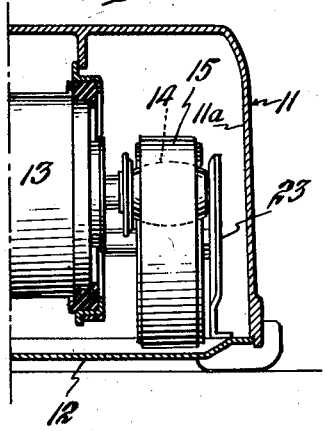
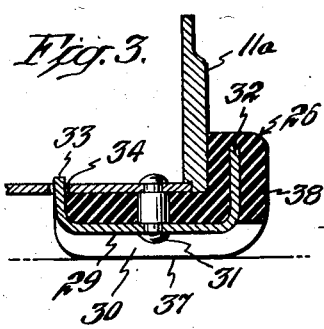
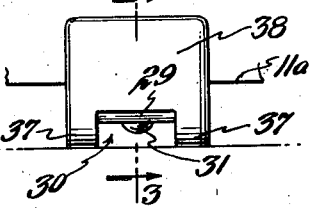
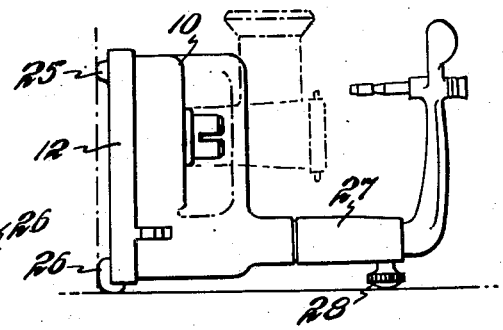
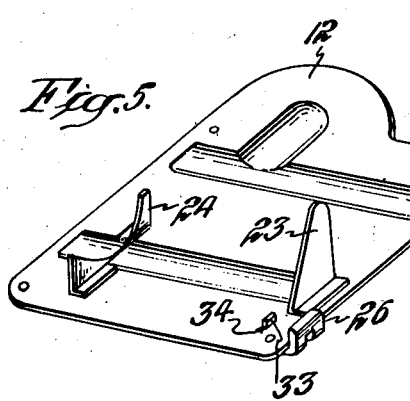
INVENTOR.
Erik Oskar Helge Hansson
BY
his ATTORNEY Patented Apr. 4, 1950

2,502,564

UNITED STATES PATENT OFFICE 2,502,564

GEARING HOUSING

Erik Oskar Helge Hansson, Stockholm, Sweden, assignor to Aktiebolaget Elektrolux, Stockholm, Sweden, a corporation of Sweden Application February 7, 1948, Serial No. 6,973
In Sweden February 23, 1945

Section 1, Public Law 690, August 8, 1946
Patent expires February 23, 1965

15 Claims. (Cl. 74—606)

This invention relates to machines primarily intended for use in the kitchen for mixing, kneading, grinding and otherwise treating food products and ingredients thereof. Such machines usually include a rotatable driving shaft to which various attachments are coupled. Some of the attachments to be coupled to the shaft require that the driving shaft be positioned horizontally, while others are intended to be coupled to the shaft while the shaft is operated in a vertical position. Hence, a machine of this kind must therefore be usable in at least two operative positions for the reason above mentioned.

One of the objects of the present invention is to provide a machine which will be operative in at least two positions; which will be provided with a casing or housing of improved construction in which the motor, transmission and associated parts will be contained and will be available for inspection, removal or repair by the taking off of a base or cover plate. The invention further contemplates the provision of means on the base or cover plate by which a guard member is provided for maintaining a driving belt contained in the housing in operative position and by means of which lateral displacement of the belt is prevented. Provision is further made for an air-deflector element on the base plate for aiding in cooling the electric motor contained within the housing.

Another object of the invention is to provide, in a machine of this kind, supporting elements or feet carried by a closure plate for the housing, said feet being so arranged and disposed that the same provide at least two resting or supporting surfaces, thereby enabling the housing to be positioned either on its bottom or on one of its sides, with the feet providing supporting surfaces for maintaining the housing in either position. Still another object of the invention is to provide a driving belt so arranged with respect to the transmission elements that said belt may be readily fitted into operative position when the cover or base plate of the housing is removed.

These and other objects to be hereinafter set forth, are attained by the invention, a more particular description of which will appear and be set forth in the claims appended hereto.

In the accompanying drawing, in which an illustrative embodiment of the invention is disclosed:

Fig. 1 shows the housing or casing portion of a kitchen machine, with a part of the housing shown in section, and with the operative work tools, such as a kneading drum removed;

Fig. 2 is a sectional view taken at a right angle to the view of Fig. 1 through a part of the machine, to show details of the belt transmission of the machine;

Fig. 3 is a sectional view through a portion of the housing or casing and the base plate and through one of the supporting feet carried by the base plate, the view being taken on the line 3—3 of Fig. 4, looking in the direction of the arrows;

Fig. 4 is a view of one of the supporting feet, looking at the structure of Fig. 3 from the right side thereof;

Fig. 5 is a perspective view of the closure or base plate, and

Fig. 6 is a side view of the machine when disposed in one of its working positions, or while the drive shaft of the machine is located horzontally, and having a work tool, such as a meat grinder, connected to the driving shaft.

With reference to the drawing, 10 indicates the casing or housing of the machine. This preferably consists of a one-piece hood 11 and an attached and removable closure plate 12, the latter being herein referred to as the "base plate" since it is located at the bottom of the casing when the machine is disposed in its vertical working position as shown in Fig. 1. The driving motor 13 of the machine is contained within the housing 10, and the shaft of the motor carries at its end a driving pulley 14. Extending from the pulley 14 is a belt 15 which connects to the pulley 16 on the shaft 16a forming a part of the machine transmission which is also contained within the housing 10.

The electric current-carrying cable 17a is connected to the machine by having its end portion, which enters into the housing, securely held by a clamping device 17 of insulating material, thus firmly holding the cable and removing the strain from the electrical connections to which the ends of the wires of the cable are attached within the housing. The switch 18 of the machine is mounted on a flange projecting from a gear housing 19. Motor 13 and the gear housing 19, in the position of the machine shown in Fig. 1, are introduced through the opening located at the bottom or lower end of the hood 11 and are securely connected to the hood by means of screws 21 which thread into lugs 20 formed on the inner face of the hood 11. Due to the space provided between the belt pulleys 14 and 16 and the adjacent hood wall 11a, as shown in Fig. 2, which space is about two-thirds of the width of the driving belt 15, the belt can be applied about the two pulleys by passing the belt through the bottom opening of the housing 10 and fitting it over the pulleys.

The base plate 12 employed to close the bottom opening of the housing 10, which is shown in detail in Fig. 5, may be a sheet metal stamping which is secured to the hood 11 to close the bottom opening thereof, by means of a plurality of screws 22. When the plate 12 is detached from the housing and the contents of the housing are thus exposed, both the switch 18 and the cable clamp 17 become accessible though the bottom opening of the hood and replacement or repair of these elements can be readily effected. The motor and gear housing are preferably, but not necessarily, provided with a seal so that these parts are not available to unskilled hands even when the closure or base plate 12 is removed.

Secured to the inside face of the base plate 12 is an upstanding lug 23 of triangular shape which, when the base plate 12 is fitted in place over the bottom opening of the housing 10, is disposed adjacent to the belt pulley 14 and tends to keep the belt from shifting laterally and being displaced from the pulley 14, as best seen in Fig. 2. The base plate 12 is also provided with a vertically disposed partition wall 24 located adjacent to the motor for directing cooling air about the motor.

When the machine is disposed in its upright position, or that shown in Fig. 1, it rests upon a plurality of supports or feet 25 and 26. These feet are attached to the plate 12 so that, when said plate is removed from the housing 10, the feet 25 and 26 are carried with it. The feet shown at 25 may be of the usual or known construction, such as disks or buttons of rubber or similar soft material, through which screws are passed and which attach the disks or buttons to the base plate 12. The feet 26, however, are of novel construction and are arranged to provide two supporting surfaces so that these feet will be effective to support the machine both while it is in the upright position shown in Fig. 1 or in the so-called "recumbent" position of Fig. 6. In the last-mentioned position, the feet 26 cooperate in supporting the machine with an adjusting element or nut 28, connected to the pillar 27 of the machine, said nut then constituting a third foot for the support of the machine.

Each foot 26 consists of an angular or L-shaped section of rubber or similar soft material, the angular shape of the foot providing two supporting surfaces, namely, those shown at 37 and 38. Each foot 26 is reinforced by a substantially U-shaped metal strap 29 which is located in a groove 30 in the foot so that only the rubber material of the foot will contact any supporting surface upon which the machine is positioned. The metal straps 29 are secured by rivets 31 to the base plate 12. The outer leg 32 of each strap 29 is more or less parallel to the bounding side wall 11a of the housing and is embedded in the body of the foot. The rivet 31, which extends through the strap 29, the foot 26 and the plate 12, attaches the foot and strap to the base plate 12. Each strap 29 is provided with a second leg, indicated at 33, which enters into a slot 34 provided in the base plate 12 to restrain the foot 26 from any tendency to shift about the rivet 31.

It will be observed from the foregoing, that each of the feet 26 not only presents two supporting surfaces, namely, those shown at 36 and 37, on either of which the machine may be rested when in its selected operating position, but since said feet 26 extend around the meeting edge of the wall 11a and the edge of the base plate, they not only protect these meeting edges but permit a relatively sharp corner or junction between the parts at this point to be formed, thus enabling the opening in the bottom of the housing 10 to be made as large as possible and facilitating the entry of the belt 15 therethrough to be fitted about the pulleys.

From the foregoing description, it will be noted that an assembly is provided in which the various operating parts of the machine within the housing 10 are accessible by the removal of a single closure plate; that said plate when fitted in position not only serves to close the bottom opening of the housing but provides within the housing a belt and air deflector, and that the plate carries supporting means for the machine, some of said supporting means being effective while the machine is disposed in both of its operating positions, said supporting means being also effective as a protective means for the meeting edges of the housing and closure plate therefor.

While I have described one embodiment of the invention, it is obvious that the same is not to be restricted thereto, but is broad enough to cover all structures coming within the scope of the annexed claims.

What I claim is:

1. In a machine of the character described, a housing containing an electric motor and gearing and a belt drive from the motor to the gearing, the casing having an open bottom, a plate removably fitted over and closing the bottom, said plate when removed exposing the motor, gearing and belt drive, and supporting feet attached to and carried by the plate, one or more of said feet being of angular form to present supporting surfaces substantially parallel to the plane of the plate as well as surfaces located beyond the edge of the plate and disposed along the side of the housing whereby the housing may be rested upon either of said surfaces of the feet.

2. In a machine of the character described, a casing enclosing a motor, a belt and gearing driven thereby, said casing having an opening through which the motor, gearing and belt are accessible, a closure plate for closing said opening, said closure plate including an upstanding guard element for disposition near the belt to prevent displacement of the same from its operative position, said plate being also provided with an air deflector element disposed within the casing adjacent to the motor, supporting feet for said plate, one or more of said feet each having a supporting surface disposed substantially parallel to the plane of the closure plate and also a surface disposed at substantially a right angle to said plane whereby the casing when resting upon a support in either of two positions will be supported on either of the surfaces of each such supporting foot.

3. In a machine of the character described, a casing containing an electric motor and reducing gearing and a belt drive between said motor and gearing, said belt drive including a pulley over which the belt extends, the housing having an opening through which access to the motor, gearing and a belt drive is had, a closure plate for said opening, said plate being provided with a guard member extending therefrom and positioned to be adjacent to the pulley when the plate is positioned to close the opening to prevent the belt from sliding off the belt pulley.

4. In a machine of the character described in claim 3, wherein the closure plate is provided with an upstanding air deflector positioned adjacent to one end of the motor when the closure plate is positioned to close the opening in the casing.

5. In a machine of the character described, a housing having an open bottom, a closure plate adapted to be attached to the housing for closing the open bottom, the edges of said plate being adapted to substantially meet the edges of the housing, and supporting feet of soft material secured to and carried by the plate, at least one of said feet having a part extending beneath the plate and also an upstanding portion fitted around and extending above the edge of the plate, the latter portion extending along the outer face of the side wall of the housing when the closure plate is positioned to close the open bottom of the housing.

6. In a machine of the character described, a housing in the form of a shell having an opening at the bottom, said opening being defined by a side wall of the shell, a closure plate adapted to be attached to the shell for closing the opening therein, a supporting foot of angular shape attached to and carried by the closure plate, said foot having a part extending over the side wall of the shell and a part extending beneath the plate when the plate is positioned to close the opening in the shell, the angular shape of the foot presenting two supporting surfaces at a right angle with respect to one another.

7. In a machine of the character described, a housing having an opening at the bottom, a plate adapted to be positioned to close the opening, a supporting foot at a peripheral edge portion of the plate, said foot being substantially L-shaped and having an upstanding part extending above the top of the plate, and means for attaching said foot to the plate so that said foot is carried only by the latter.

8. In a structure as provided for in claim 7, wherein a metal reinforcement is embedded in the foot, a fastening element extending through said reinforcing element and through the closure plate, a portion of said reinforcing element projecting out of the body of the foot, and the closure plate being provided with an aperture in which said projecting portion of the reinforcing element enters.

9. In an electrically operated kitchen machine having driving means comprising a plurality of parts including an electric motor and reducing gearing and a belt drive therebetween, said belt drive including spaced apart pulleys and a connecting belt; a housing comprising a one-piece casing forming an overlying hood member for said parts having a first opening and a second bottom opening when the machine is positioned so that the side walls of said hood extend downwardly; said housing including a plate member which is detachably secured to said hood for closing the second opening which is of sufficient size to enable all of said parts to be inserted therethrough into said hood; a driving shaft associated with said reducing gearing; and said electric motor, reducing gearing and belt being adapted to be supported in said hood so that said driving shaft extends through the first opening to facilitate coupling of a driven member thereto.

10. In an electrically operated kitchen machine as set forth in claim 9 which includes means cooperating with one of said belt pulleys to prevent said belt from slipping therefrom.

11. In an electrically operated kitchen machine as set forth in claim 9 in which such machine is adapted to be placed into at least two different operative positions, supporting members or feet for supporting the machine in said different operative positions, and one or more of said supporting members or feet being formed and arranged so that one and the same member is capable of acting as a supporting foot for the machine in at least two different operative positions thereof.

12. In an electrically operated kitchen machine as set forth in claim 11 in which one or more of said supporting members or feet are formed and arranged so that one and the same member is capable of acting as a supporting foot for the machine in at least two different operative positions substantially at an angle of 90° with respect to another.

13. In an electrically operated kitchen machine as set forth in claim 9 in which said reducing gearing is mounted only on one of said housing members.

14. In an electrically operated kitchen machine as set forth in claim 9 which includes means for fixing said electric motor, reducing gearing and belt drive in position at the inner face of said hood whereby the latter constitutes a common support for the aforementioned parts, said pulleys being positioned in said hood to enable said belt to be mounted thereon when said belt is inserted into the hood through the second opening.

15. In an electrically operated kitchen machine as set forth in claim 14 in which said pulleys and connecting belt are positioned in said hood in a plane which is at the vicinity of a side wall thereof, said pulleys being spaced from such side wall to provide a gap therebetween which is sufficiently wide to enable said belt to be mounted on said pulleys when inserted into said hood through the second opening.

ERIK OSKAR HELGE HANSSON.

REFERENCES CITED

The following references are of record in the file of this patent:

UNITED STATES PATENTS

| Number | Name | Date |
|---|---|---|
| 2,223,028 | Dobson | Nov. 26, 1940 |
| 2,317,934 | Moury | Apr. 27, 1943 |

FOREIGN PATENTS

| Number | Country | Date |
|---|---|---|
| 10,381 | Australia | Nov. 14, 1927 |
| 103,226 | Australia | May 22, 1937 |